US00RE40298E

(19) United States
(12) Reissued Patent
Litvin

(10) Patent Number: US RE40,298 E
(45) Date of Reissued Patent: May 6, 2008

(54) INSULATED BOX FAN

(75) Inventor: Charles Litvin, West Chester, PA (US)

(73) Assignee: Lasko Holdings, Inc., Wilmington, DE (US)

(21) Appl. No.: 10/425,274

(22) Filed: Apr. 29, 2003

Related U.S. Patent Documents

Reissue of:
(64) Patent No.: 6,309,192
Issued: Oct. 30, 2001
Appl. No.: 09/277,598
Filed: Mar. 26, 1999

(51) Int. Cl.
*F04B 17/00* (2006.01)

(52) U.S. Cl. ..... 417/423.14; 416/244 R; 415/213.1; 417/423.8

(58) Field of Classification Search ..... 417/423.14, 417/423.8, 373, 244 R, 247 R, 423.15; 415/213.1; 310/89, 91
See application file for complete search history.

(56) References Cited

U.S. PATENT DOCUMENTS

| | | | | | |
|---|---|---|---|---|---|
| 2,867,377 | A | * | 1/1959 | Lasko | 417/326 |
| 3,310,698 | A | * | 3/1967 | Krell | 310/258 |
| 4,086,785 | A | * | 5/1978 | Kochendorfer et al. | 62/414 |
| 4,120,615 | A | * | 10/1978 | Keem et al. | 417/360 |
| 4,350,472 | A | * | 9/1982 | Morimoto | 415/125 |
| 4,636,669 | A | * | 1/1987 | Plunkett et al. | 310/51 |
| 5,061,405 | A | * | 10/1991 | Stanek et al. | 261/26 |
| 5,788,566 | A | * | 8/1998 | McAnally et al. | 454/184 |
| 5,879,232 | A | * | 3/1999 | Luter et al. | 454/349 |
| 5,955,955 | A | * | 9/1999 | Corcoran, Jr. et al. | 340/607 |
| 6,015,265 | A | * | 1/2000 | Lasko et al. | 416/247 R |
| 6,227,822 | B1 | * | 5/2001 | Chen | 417/423.7 |

* cited by examiner

*Primary Examiner*—William H. Rodriguez
(74) *Attorney, Agent, or Firm*—RatnerPrestia

(57) ABSTRACT

An insulated box fan, which includes an outer metal housing with two vertical metal brackets to which a plastic isolator ring is attached, and which ring is also attached to the fan motor, to electrically insulate it from the fan housing, and to direct additional cooling air to the fan motor.

26 Claims, 6 Drawing Sheets

INSULATED BOX FAN

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to an insulated box fan of the type wherein the motor is electrically insulated from the rest of the fan by an isolator ring.

2. Description of the Prior Art

Box fans are perhaps the most common fan in the industry. Historically, box fans are constructed of metal and plastic and are one of the least expensive fans, they provide a high volume of air, are of relatively light weight, are sturdy and long lasting, are versatile in that they can be placed on virtually any flat surface, and are stable and resist toppling.

With the use in fans of six pole motors and the increasing use of four pole motors, which use capacitors and consequent higher operating voltages, problems can arise if the fan is placed into a window, and the air being moved by the fan becomes moisture laden air, or if water comes directly onto the fan.

One of the problems from moisture laden air is that the water may provide a current leakage path to parts of the fan that come into contact with the user.

Box fans typically mount the motor, which has a metal outer casing, directly to vertical metal brackets in the fan, so that if the motor casing is electrically charged, the fan housing will also become charged, and present a hazard to the user.

The fan of the invention is designed to isolate the motor housing from the fan mounting brackets to prevent the fan housing from becoming electrically charged, and provides other positive advantages.

SUMMARY OF THE INVENTION

It has now been found that an insulated box fan is available, wherein the fan motor is electrically insulated from the fan housing by an isolator ring.

The principal object of the invention is to provide a box fan that has a fan motor that is electrically insulated from the fan housing.

A further object of the invention is to provide a box fan that is simple and inexpensive to construct.

A further object of the invention is to provide a box fan which maintains the mechanical and structural integrity of the metal bracket portion of the fan.

A further object of the invention is to provide a box fan wherein the basic fan housing structure is not modified, and which provides a slim streamlined box fan.

A further object of the invention is to provide a box fan that can be safely placed in a window.

A further object of the invention is to provide a box fan with improved air flow to the fan motor for better cooling.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which.

Figure 1:
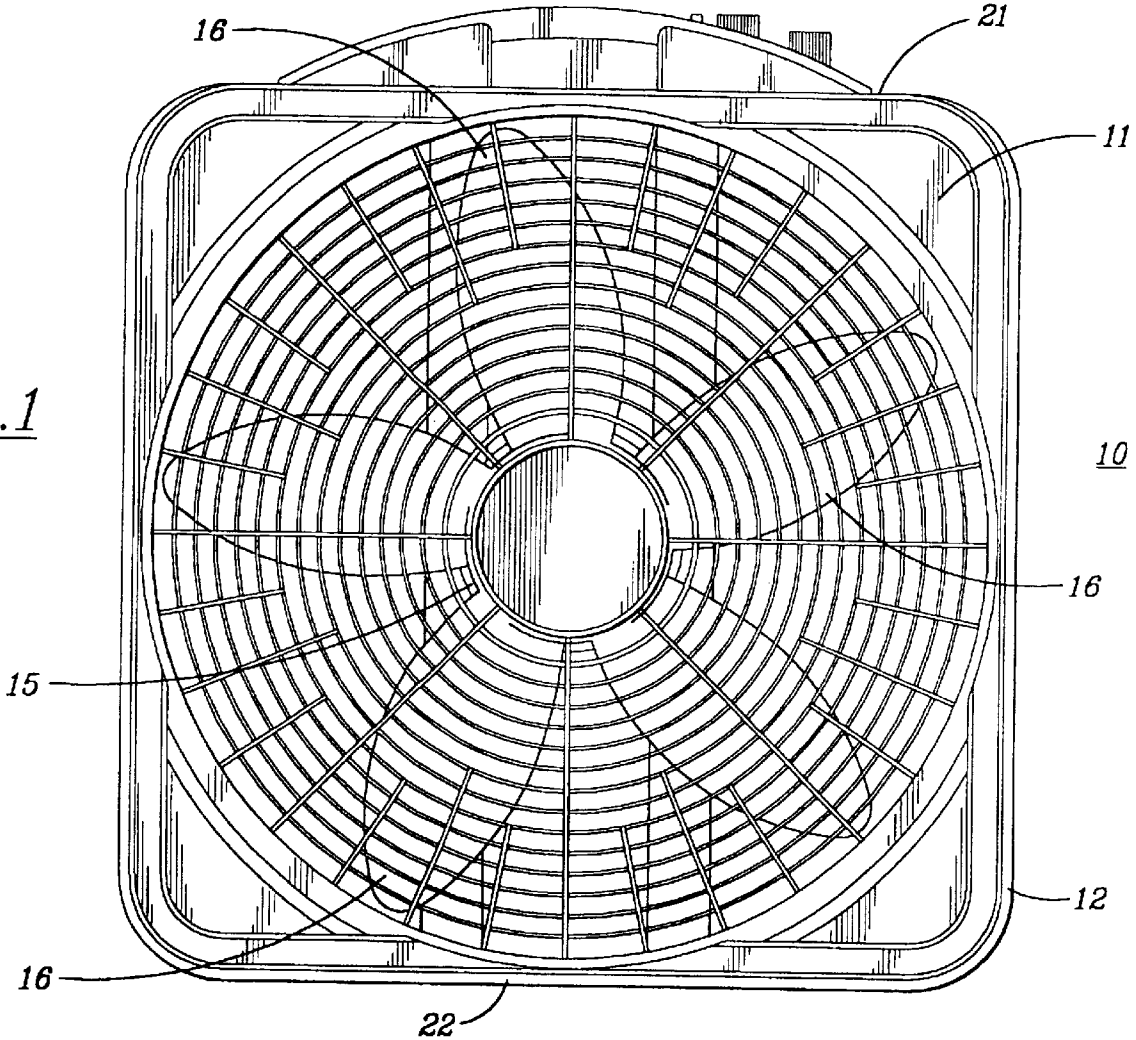
FIG. 1 is a front view of a box fan which incorporates the invention.

It should, of course, be understood that the description and drawings herein are merely illustrative and that various modifications and changes can be made in the structures disclosed without departing from the spirit of the invention.

Like numerals refer to like parts throughout the several views.

DESCRIPTION OF THE PREFERRED EMBODIMENTS

When referring to the preferred embodiments, certain terminology will be utilized for the sake of clarity. Use of such terminology is intended to encompass not only the described embodiment, but also technical equivalents which operate and function in substantially the same way to bring about the same result.

Referring now more particularly to FIGS. 1-4, inclusive, a box fan 10 is illustrated which has a front grill 11, an outer rectangular fan housing 12, a fan motor 14, with a fan hub 15, and a plurality of fan blades 16 extending therefrom.

The front grill 11 is preferably of molded synthetic plastic and the fan housing 12 is preferably of stamped metal.

A rear grill (not shown) would also be provided, which could having a design similar to front grill 11.

The fan housing 12 has a pair of spaced vertical brackets 20 extending from the top 21 of the housing 12 to the bottom 22, which brackets 20 are preferably of metal, to add strength and rigidity to the fan housing 12.

Figure 2:
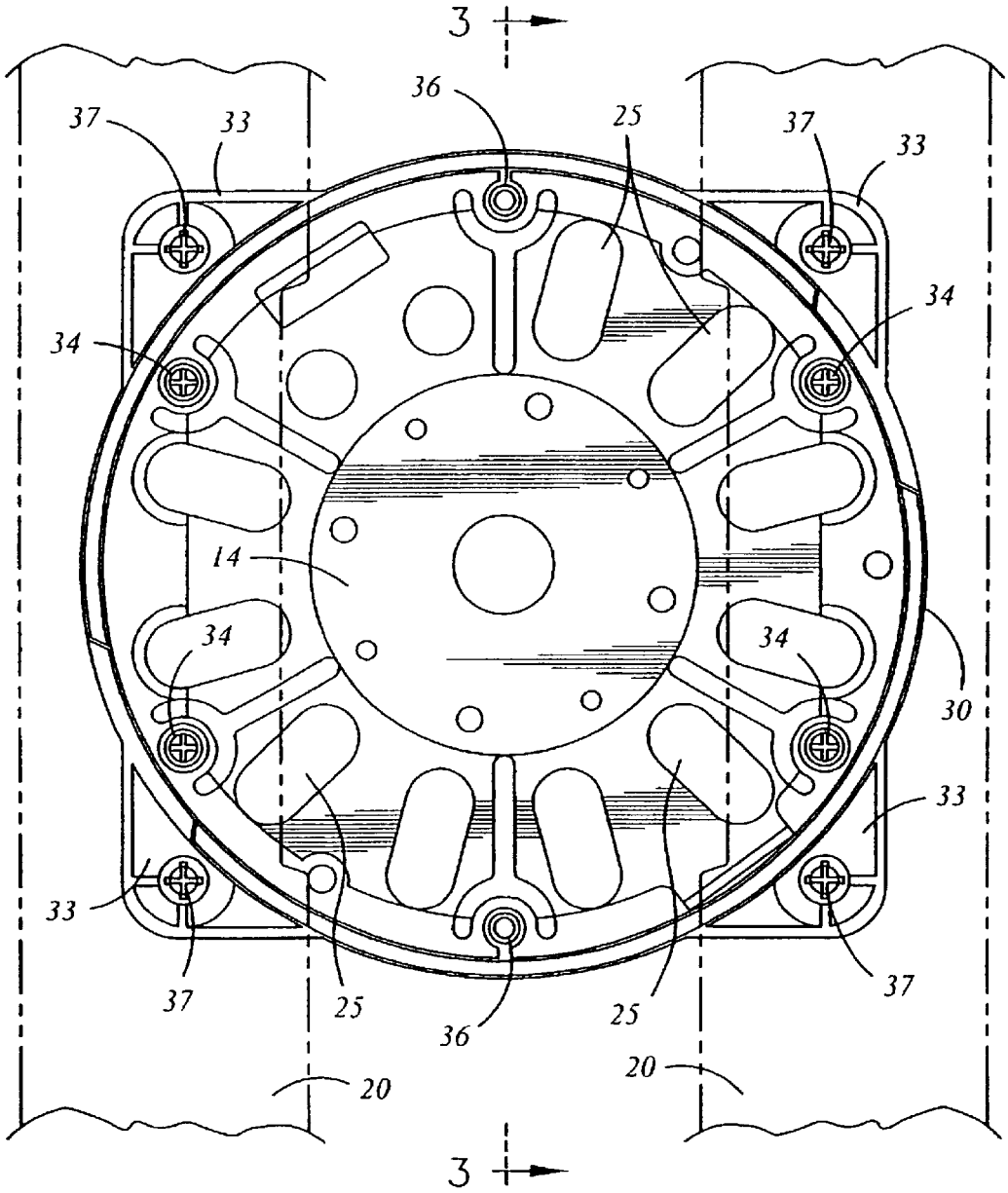
FIG. 2 is a fragmentary rear view of one embodiment of a portion of the box fan of FIG. 1.
Figure 4:
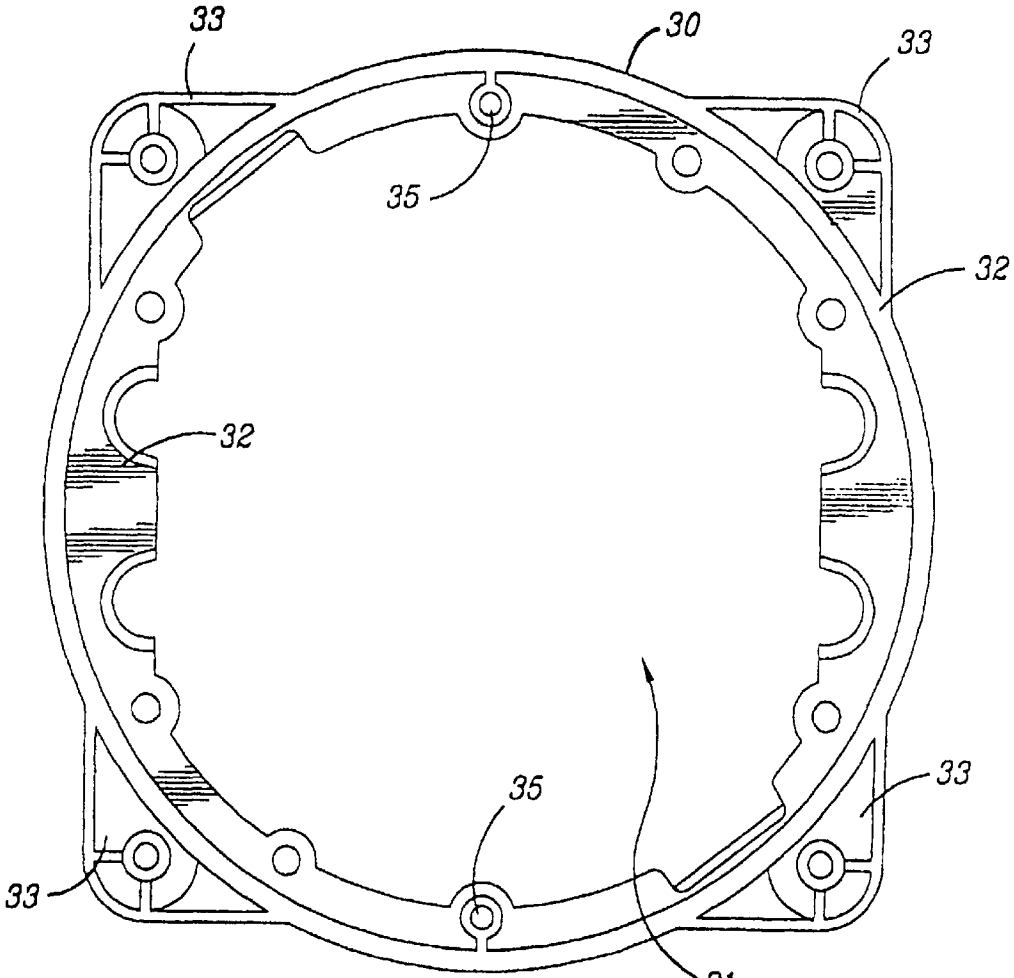
FIG. 4 is a front view of an isolator ring of the fan of FIG. 3.
Figure 3:
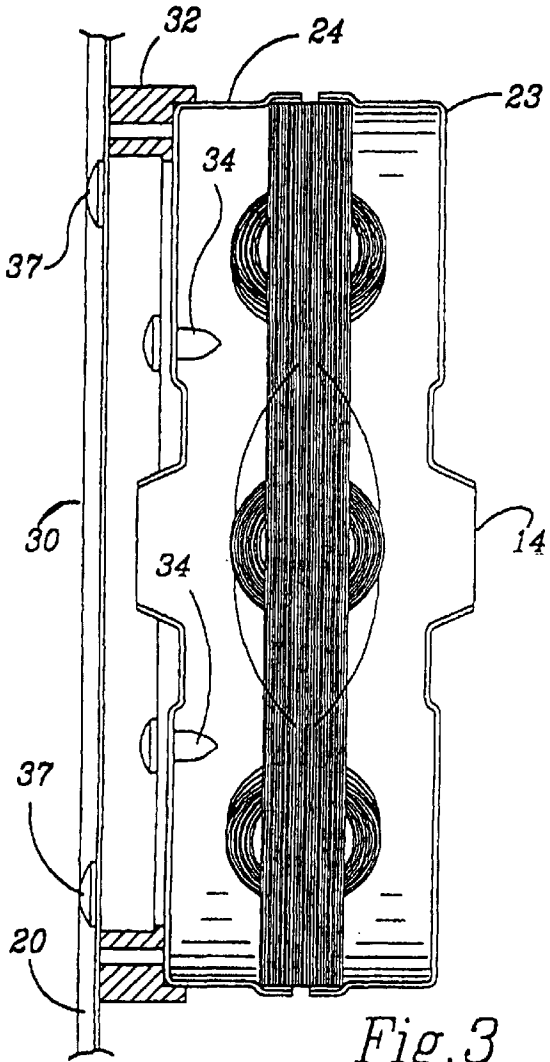
FIG. 3 is a vertical sectional view, taken approximately on the line 3-3 of FIG. 2.

The embodiment of fan motor 14 illustrated in detail in FIGS. 2 and 3 is a six (6) pole motor, which has a front casing 23 and a rear casing 24.

The rear casing 24 is of dish shape with a plurality of radial cutouts 25.

An isolator ring 30 is provided, which is of molded plastic, with polypropylene plastic being the preferred material.

The isolator ring 30 is of dish shape, open in the center 31, and includes a rim 32 with projections 33, four being shown, and spaced with two at the top and two at the bottom.

The motor casing 24 is attached to rim 32 by four screws 34, which extend through rim 32 into threaded openings (not shown) in casing 24.

The rim 32 has openings 35 at the top and bottom with locating pins 36 therein, which extend from motor casing 24.

The projections 33 have screws 37 engaged therein, four being illustrated, which screws extend through openings (not shown) in brackets 20, retaining ring 30 thereto.

Figure 5:
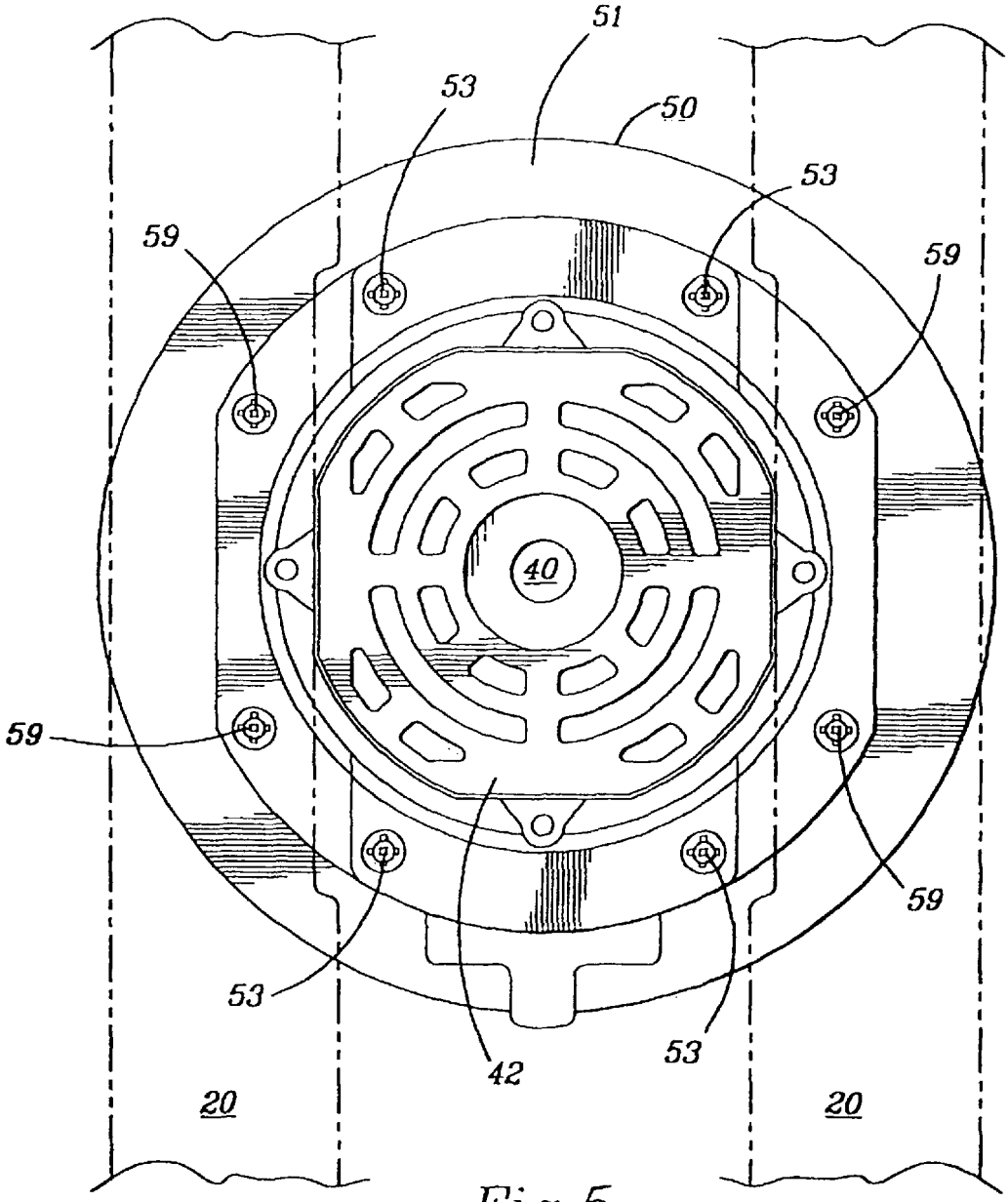
FIG. 5 is a view similar to FIG. 2, illustrating another embodiment of a portion of a box fan.
Figure 6:
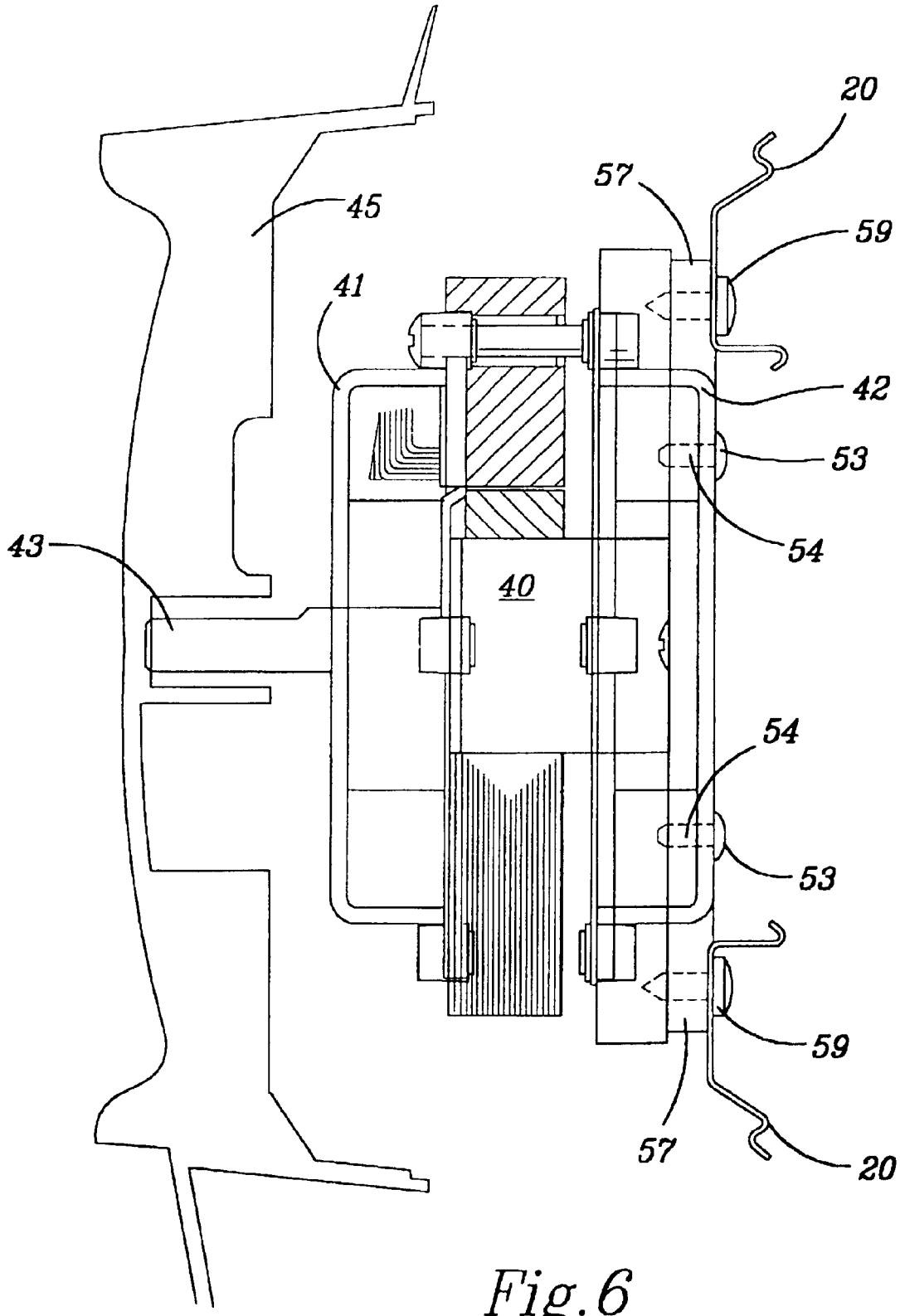
FIG. 6 is a horizontal sectional view, taken approximately on the line 6-6 of FIG. 5.
Figure 7:
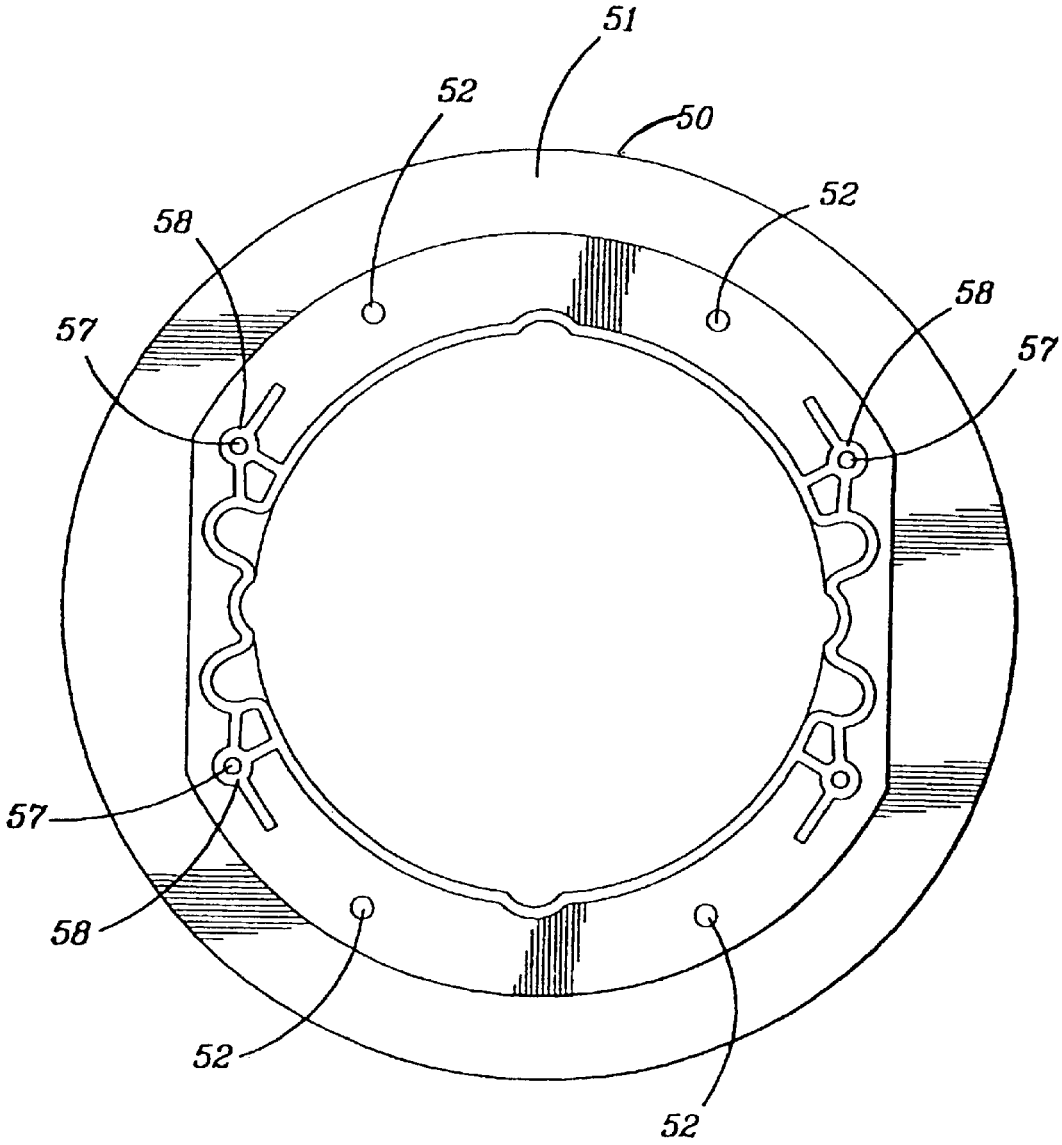
FIG. 7 is a front elevational view of an isolator ring used in the fan illustrated in FIG. 5.

Referring now more specifically to FIGS. 5-7 inclusive, another embodiment of the invention is illustrated, with a four (4) pole motor 40, which includes a front dish shaped casing 41, and a rear dish shaped casing 42.

The motor 40 has an output shaft 43 with a blade hub 45 thereon.

An isolator ring 50 is provided, which is of molded plastic with polypropylene plastic being preferred.

The ring 50 has a wide rim 51, with spaced openings 52, which have screws 53 therein, four being illustrated, which extend therethrough into threaded openings 54 in casing 42 to retain motor 40 thereon.

The configuration of the rim 51 has been found to better direct the air to cool the motor than with previous structures, and it has been found that the operating temperature of the fan motor may be lowered by as much as 2.5 degrees centigrade by use of the ring 50.

The rim 51 has four spaced 57 bosses thereon, which have openings 58 therein, and as shown in FIGS. 5,6, have screws 59 therein, which screws 59 extend through openings (not shown) in the brackets 20 of a fan housing (not shown) similar to that described above, to retain the motor 40 thereon. While at least two screws are shown in each bracket 20, variations can be used where the bracket could have an opening (not shown), which would have a tab (not shown) from the ring 50 engaged therein, and one screw 59.

It will thus be seen structure has been provided with which the objects of the invention are achieved.

I claim:

1. In combination with a box fan which includes a rectangular metal outer housing, at least one grill on said housing, a pair of spaced vertical metal brackets connected to said housing, a fan motor having a front casing and a rear casing, the improvement which comprises an electrically insulating ring, said ring is connected to said fan motor rear casing by at least one screw, which passes through said ring into said rear casing, and said ring is connected to said brackets by at least two screws, which pass through said brackets and are engaged in said ring.

2. A box fan as defined in claim 1 in which said ring is of molded plastic.

3. A box fan as defined in claim 1 in which said ring is of circular configuration.

4. A box fan as defined in claim 1 in which said ring has rim means to direct cooling air to said fan motor to reduce its operating temperature.

*5. An electrically insulated box fan comprising:*

*a substantially rectangular metal outer housing;*

*at least one grill on said housing;*

*at least two metal brackets connected to said housing;*

*a fan motor comprising:*

*a front casing, and*

*a rear casing;*

*at least one substantially rigid electrical insulator;*

*said at least one substantially rigid electrical insulator directly coupled to at least one of said fan motor casings; and*

*said at least one substantially rigid electrical insulator coupled to at least one metal brackets by at least one attaching member, which passes through said at least one of said metal brackets and engages said at least one substantially rigid electrical insulator,*

*wherein said motor is electrically insulated from said metal outer housing.*

*6. The electrically insulated box fan according to claim 5, wherein said at least one attaching member is a screw.*

*7. The electrically insulated box fan according to claim 5, wherein said at least one insulator is coupled to a rear portion of said fan motor casing.*

*8. The electrically insulated box fan according to claim 5, wherein said at least one insulator is formed from a polymer.*

*9. The electrically insulated box fan according to claim 5, wherein said box fan is also a window fan.*

*10. The electrically insulated box fan according to claim 5, wherein said front and/or rear casing further comprises at least one extension and said at least one electrical insulator is connected to said at least one extension.*

*11. An electrically insulated motor mount and fan combination comprising:*

*a fan comprising:*

*a metal outer housing,*

*at least one grill on said housing,*

*at least two metal brackets connected to said housing, and*

*a fan motor having a front casing and a rear casing; and*

*at least one substantially rigid electrically insulated motor mount comprising:*

*a first portion coupled directly to said fan motor; and*

*a second portion coupled to at least one of said at least two metal brackets of said fan,*

*wherein said substantially rigid electrically insulated motor mount insulated said fan motor from said metal outer housing of said fan.*

*12. The combination according to claim 11, wherein said first portion includes a locator for positioning said electrical insulator relative to at least a portion of said fan motor.*

*13. The combination according to claim 11, wherein said second portion is coupled to said at least one of said brackets with at least one coupling device.*

*14. The combination according to claim 13, wherein said coupling device is a screw.*

*15. The combination according to claim 11, wherein said fan is one of a box fan and/or a window fan.*

*16. An improvement in combination with a fan which includes a metal outer housing, at least one grill on said housing, at least a pair of metal brackets connected to said housing, a fan motor having a front casing and a rear casing, the improvement comprising:*

*at least one substantially rigid electrical insulator;*

*said at least one substantially rigid electrical insulator being coupled to only one of said front or rear casing of said fan motor; and*

*said at least one substantially rigid electrical insulator being coupled to at least one of said metal brackets by at least one attaching member which passes through at least one of said metal brackets and engages said at least one electrical insulator,*

*wherein said at least one substantially rigid electrical insulator entirely supports said fan motor relative to said metal brackets and said metal outer housing.*

*17. The improvement according to claim 16, wherein said at least one attaching member is a screw.*

*18. The improvement according to claim 16, wherein said fan is one of a box fan and/or a window fan.*

*19. The improvement according to claim 16, wherein said at least one electrical insulator is formed from a polymer.*

*20. The improvement according to claim 16, wherein said electrical insulator separates said fan motor casing from said metal brackets.*

*21. The improvement according to claim 16, wherein said at least one electrical insulator completely insulates said fan motor electrically from said metal outer housing.*

*22. The improvement according to claim 16, wherein said rear casing further comprises at least one orifice to locate and position said at least one electrical insulator relative to said fan motor.*

*23. The improvement according to claim 22, wherein said at least one attaching member passes through and/or into said orifice.*

*24. The improvement according to claim 16, wherein said at least one electrical insulator is coupled to said rear casing with at least one coupling device distinct from said attaching member.*

*25. In combination with a box fan which includes a rectangular metal outer housing, at least one grill on said housing, at least a pair of spaced metal brackets connected to said housing, a fan motor having a front casing and a rear casing, the improvement comprising:*

*at least one substantially rigid electrically insulating member,*

*said at least one substantially rigid electrically insulating member directly coupled to said fan casing by at least one respective attaching member; and*

*said at least one respective attaching member passing through one of said metal brackets and into said at least one substantially rigid electrically insulating member.*

*26. An electrically insulated box fan comprising:*

*a substantially rectangular metal outer housing;*

*at least one grill on said housing;*

*at least two metal brackets connected to said housing;*

*a fan motor comprising:*

*a front casing, and*

*a rear casing;*

*at least one electrical insulator for substantially rigidly supporting said fan motor;*

*said at least one electrical insulator directly coupled to at least one of said fan motor casings; and*

*said at least one electrical insulator coupled to said at least one of said metal brackets by at least one attaching member, which passes through said at least one metal bracket and engages said at least one rigid electrical insulator,*

*wherein said motor is electrically insulated from said metal outer housing.*

* * * * *

UNITED STATES PATENT AND TRADEMARK OFFICE

CERTIFICATE OF CORRECTION

PATENT NO. : RE 40,298 E
APPLICATION NO. : 10/425274
DATED : May 6, 2008
INVENTOR(S) : Charles Litvin It is certified that error appears in the above-identified patent and that said Letters Patent is hereby corrected as shown below:

At Column 3, line 62, should read:

coupled to at least one of said metal brackets by at least one

Signed and Sealed this

Twenty-ninth Day of July, 2008

JON W. DUDAS
*Director of the United States Patent and Trademark Office*